(12) United States Patent
Maiwa

(10) Patent No.: US 11,493,089 B2
(45) Date of Patent: Nov. 8, 2022

(54) ROLLING BEARING

(71) Applicant: NTN Corporation, Osaka (JP)

(72) Inventor: Tsutomu Maiwa, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 17/212,246

(22) Filed: Mar. 25, 2021

(65) Prior Publication Data

US 2021/0317878 A1 Oct. 14, 2021

(30) Foreign Application Priority Data

Apr. 10, 2020 (JP) .............................. JP2020-070906
Feb. 18, 2021 (JP) .............................. JP2021-024167

(51) Int. Cl.
*F16C 33/66* (2006.01)
*F16C 33/32* (2006.01)
*F16C 19/06* (2006.01)

(52) U.S. Cl.
CPC .......... *F16C 33/6648* (2013.01); *F16C 19/06* (2013.01); *F16C 33/32* (2013.01); *F16C 33/6696* (2013.01)

(58) Field of Classification Search
CPC .............................. F16C 33/32; F16C 33/6648
See application file for complete search history.

(56) References Cited

U.S. PATENT DOCUMENTS

| | | | | |
|---|---|---|---|---|
| 5,615,955 A * | 4/1997 | Namimatsu | ......... | F16C 29/0642 384/13 |
| 5,823,686 A * | 10/1998 | Murano | ................ | F16C 19/466 384/492 |
| 6,367,982 B1 * | 4/2002 | Doi | ......................... | F16G 13/06 384/463 |
| 6,499,374 B1 * | 12/2002 | Ohga | ...................... | F16C 19/20 74/424.82 |
| 2008/0234086 A1 * | 9/2008 | Fujiwara | ................ | F16G 13/06 474/209 |

FOREIGN PATENT DOCUMENTS

| | | | |
|---|---|---|---|
| DE | 19612571 | * | 10/1997 |
| JP | H06-129437 A | | 5/1994 |
| JP | 2000205267 | * | 7/2000 |
| JP | 4038341 B2 | | 1/2008 |
| JP | 6017239 B | | 10/2016 |
| WO | WO202109127 | * | 5/2021 |

* cited by examiner

*Primary Examiner* — James Pilkington
(74) *Attorney, Agent, or Firm* — Muncy, Geissler, Olds & Lowe, P.C.

(57) ABSTRACT

A rolling bearing makes use of a porous rolling element and a selected kind of lubricant to impregnate with; is usable in various conditions; does not discharge foreign objects; and features low dust generation and long life. The rolling bearing includes an outer ring 2; an inner ring 1; and a plurality of rolling elements 3 assembled between mutually opposed outer ring track surface 2a and inner ring track surface 1a. The plurality of rolling elements 3 is provided by a combination of a porous rolling element 3a impregnated with a lubricant and a non-porous rolling element 3b.

13 Claims, 1 Drawing Sheet

ROLLING BEARING

TECHNICAL FIELD

The present invention relates to rolling bearings superior in lubrication property.

BACKGROUND ART

As a conventional rolling bearing superior in lubrication property, Patent Literature 1 discloses one in which one of its rolling surface and rolling element is formed of a porous ceramics impregnated with a lubricant oil.

Also, Patent Literature 2 discloses a rolling bearing in which one or more rolling elements are formed of a solid lubricant material such as tungsten disulfide for improved lubrication property achieved by lubricant powder of the solid lubricant material when the elements are rolling. Also, Patent Literature 3 discloses an arrangement that a plurality of rolling elements include one or more non-load-bearing rolling elements which are formed of a polytetrafluoroethylene resin (PTFE).

CITATION LIST

Patent Literature

Patent Literature 1: JP-A H6-129437 Gazette
Patent Literature 2: JP-B 6017239 Gazette
Patent Literature 3: JP-B 4038341 Gazette Rolling bearings are used in various applications, such as a high temperature application (for fixation and tenter clip lines), a high temperature and vacuum application in transportation lines for PVD (physical vapor deposition), CVD (chemical vapor deposition), etc., an electrically conductive application (for photosensitive drums), and a vacuum and low dust-generation application (for equipment related to semiconductor manufacturing equipment). Also, in a room temperature application, rolling bearings are utilized under conditions where low-torque is required (such as in guide rollers).

However, in the rolling bearing disclosed in Patent Literature 1, the track ring or the rolling element formed of the porous ceramics are designed to receive a load. This means that the bearing could be crushed under a pressure and therefore it cannot be utilized in heavy-load applications.

Also, in the rolling bearing disclosed in Patent Literature 1, it is recommended that, in order to avoid excessive decrease in strength, the porous ceramics should have a degree of porosity not greater than 30 percent. However, there is a risk that a low degree of porosity means that an amount of lubricant oil which can be impregnated therewith is limited, and this can also limit the life of the bearing. Also, in cases where the load-bearing rolling elements have a low degree of accuracy (in terms of their dimension and/or sphericity/roundness), there can be consequences that the bearing cannot rotate smoothly and/or its life is shortened. Further, there can be situations where certain specific rolling elements become subjected to excessive load, leading to promoting the above-mentioned crushing by pressure. Still further, if the porous rolling elements are manufactured by sintering, the grinding process could clog the pores.

The rolling bearing disclosed in Patent Literature 2, in which one or more rolling elements are formed of a solid lubricant such as tungsten disulfide, provides lubrication by the solid lubricant when the bearing is turning. However, as the rolling elements which are made of the solid lubricant wear, the used lubrication powder then acts as a foreign object, potentially leading to disturbed rotation of the bearing. Also, once the solid lubricant is discharged, it can act as a dust which may contaminate the bearing and the equipment that includes the bearing.

It is therefore an object of the present invention to provide a rolling bearing which makes use of a porous rolling element and a selected type of lubricant oil to impregnate therewith, that is usable in various applications, does not discharge foreign objects, and features low dust-generation and long life.

SUMMARY OF THE INVENTION

A rolling bearing according to the present invention as a solution to the above-described problems includes an outer ring 2; an inner ring 1; and a plurality of rolling elements 3 assembled between a track surface 2a formed in an inner circumferential surface of the outer ring 2 and a track surface 1a formed in an outer circumferential surface of the inner ring 1; and is characterized in that the plurality of rolling elements 3 is provided by a combination of a porous rolling element 3a impregnated with a lubricant oil and a non-porous rolling element 3b.

DESCRIPTION OF EMBODIMENTS

Hereinafter, description will be made for embodiments of the present invention, with reference to the attached drawings.

Figure 1:
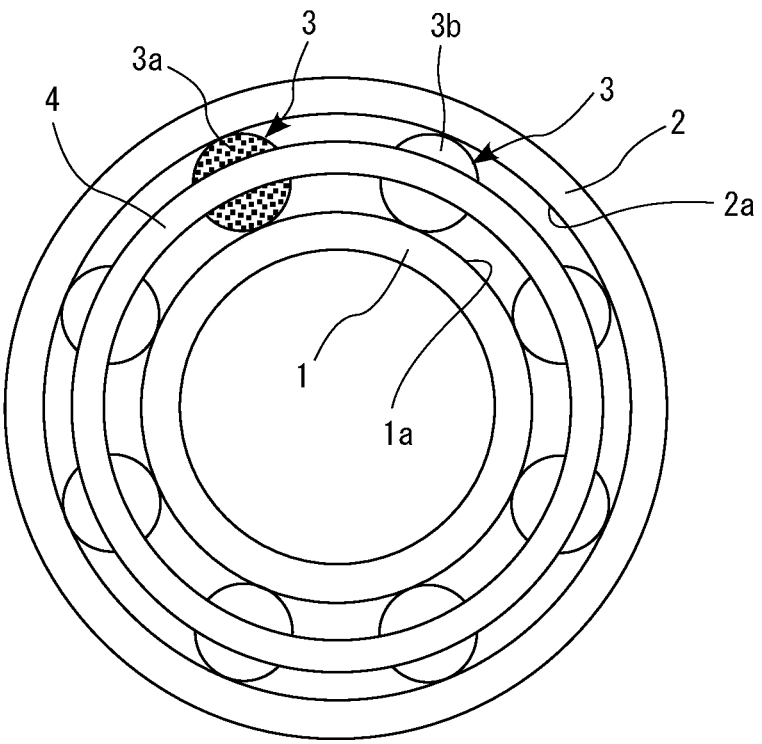
FIG. 1 is a side view of a rolling bearing according to an embodiment of the present invention.

A rolling bearing according to an embodiment of the present invention shown in FIG. 1 includes an outer ring 2, an inner ring 1, a plurality of rolling elements 3 assembled between a track surface 2a provided on an inner circumferential surface provided on the outer ring 2 and a track surface 1a of an outer circumferential surface of the inner ring 1; and a retainer 4 to hold the plurality of rolling elements 3 equidistantly.

A quantity of the rolling elements 3 is eight; one of which is provided by a porous rolling element 3a impregnated with a lubricant oil while the others are provided by a non-porous rolling element 3b.

The rolling elements 3 may be provided by whichever of balls and rollers.

The porous rolling element 3a is most preferably made of a ceramics in view of heat resistance and strength, but copper-based and iron-based sintered metal, and other porous metal materials are also preferable. If the porous rolling element 3a is to be used in applications which require low dust generation, it is more preferable to use PTFE (polytetrafluoroethylene resin) as the material. When the porous rolling element 3a has depleted all the lubricant oil impregnated therewith, there could be a concern that the porous rolling element 3a wears at an increased rate and generate dust. However, PTFE serves as a solid lubricant by itself, so even after the porous rolling element 3a experiences surface wear, there is a transfer supply of the lubricant material, which will then stick onto the worn surface, and therefore it is expected that the arrangement will provide a further extended durability and low dust-generation characteristic. Since the porous rolling element 3a which is made of PTFE has superior in low dust-generation and outgas generation characteristics, it is applicable not only in atmospheric applications but also vacuum applications. Also, PTFE is a material whose melting point exceeds 300 degrees Celsius, and therefore applicable in high temperature conditions not higher than 300 degrees Celsius if combined with a compatible impregnated lubricant oil. Table 1 shows comparison between materials for the porous ball. It should be noted here that although Patent Literature 3 discloses that a plurality of rolling elements include one or more rolling elements which are formed of PTFE, that PTFE rolling elements are solid balls, and it is not possible to impregnate them with a lubricant oil.

TABLE 1

| Material of Porous Rolling Element | | Heat Tolerance (Usable Temperature) | Low Dust-Generation Characteristic*1 after Impregnated Lubricant Oil*2 is Consumed | Outgas from Material*3 |
|---|---|---|---|---|
| Resin | PTFE | ○ (Up to 300 deg. C.) | ◎ | ○ |
| | PE (Polyethylene) | Δ (Up to 90 deg. C.) | Δ | Δ |
| Sintered Metal Porous Metal | | ◎ | Δ | ○ |
| Ceramics | | ◎ | Δ | ○ |

*1 A multialkylated cyclopentane lubricant oil was impregnated.
*2 To measure dust generation, a particle counter was used to count particles in 28.3 liters (1 cubic foot) of air every hour (in 5-hour period). Class means degrees of clean-room purification, indicating the number of particles within 28.3 liters (1 cubic foot) of air (USA Fed. Std. 209E).
*3 Outgas from the material was measured according to GC-MS.
Legend
◎: Excellent
○: Good
Δ: Usable The number of the porous rolling element 3a should be one or more, but not more than half of the total number of the rolling element 3.

Figure 2:
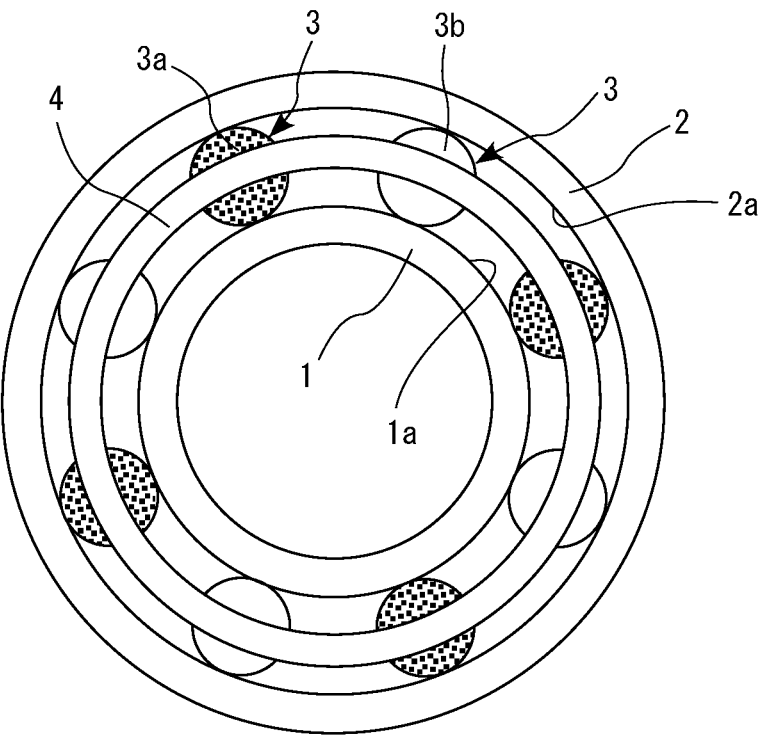
FIG. 2 is a side view of a rolling bearing according to another embodiment of the present invention.

FIG. 2 shows an embodiment, in which porous rolling elements 3a account for a half of the total number of the rolling elements 3, namely, the embodiment uses four porous rolling elements 3a and four non-porous rolling elements 3b.

The non-porous rolling elements 3b which bear the load may be provided by solid balls and rollers, and these balls and rollers may be made of steel or ceramics.

Hereinafter, description will cover a evaluation experiment conducted with deep-groove ball bearings (diameter: 8×22×7, made of SUS440C) as test bearings. In this test, a rolling bearing according to the present invention (Invention) was compared with other rolling bearings (Comparative products 1 through 4).

TABLE 2

| | | Bearing Construction/ Lubrication Method | Invention One of the rolling elements is a porous ball impregnated with lubricant*1 | Comparative Product 1 No lubrication | Comparative Product 2 PTFE coating provided inside the bearing | Comparative Product 3 Greased bearing for use in vacuum in which grease is packed inside the bearing | Comparative Product 4 One of the rolling elements is a solid lubricant ball of tungsten disulfide |
|---|---|---|---|---|---|---|---|
| Test Items | 1 | Rolling Torque | Low | Extremely Low | Intermediate | High | Low |
| | 2 | Durability (Until Seizure) | ○ | X (Locked in 20 minutes) | Δ | ◎ | ○ |
| | 3 | Dust generation measuring method (Measured in atmosphere) *2 | ○ (Class 100) | — | ◎ (Class 10 to 100) | ○~Δ*3 (Class 100 to 1000) | X |

*1 A multialkylated cyclopentane lubricant oil was impregnated.
*2 To measure dust generation, a particle counter was used to count particles in 28.3 liters (1 cubic foot) of air every hour (in 5-hour period). Class means degrees of clean-room purification, indicating the number of particles within 28.3 liters (1 cubic foot) of air (USA Fed. Std. 209E).
*3 Dust generation value varies from one grease brand to another.
Legend
◎: Excellent
○: Good
Δ: Usable
X: Not good The test conditions for each test item are shown in Table 3.

TABLE 3

|  |  | Ambient Air (Atmospheric/Vacuum) | Temperature | Rotating Speed | Load (Axial) |
| --- | --- | --- | --- | --- | --- |
| Test 1 | Rotation Torque | Atmosphere | Room Temperature | 200 min$^{-1}$ | 29.4N |
| Test 2 | Durability | Vacuum ($10^{-5}$ Pa) | Room Temperature | 200 min$^{-1}$ | 29.4N |
| Test 3 | Dust Generation | Atmosphere | Room Temperature | 800 min$^{-1}$ | 29.4N |

As discussed above, in the rolling bearing according to the present invention, part of the plurality of rolling elements 3 is provided by the porous rolling element 3a impregnated with a lubricant oil. Therefore, it is possible, with the porous rolling elements 3a impregnated with the lubricant oil, to provide minimum necessary lubrication, and hence, unlike situations where grease is used, it is possible to decrease smear around the bearing, and also the bearing is usable under low-temperature conditions since it is possible to prevent torque increase which is caused by stirring resistance and decreased fluidity when temperatures are low.

Also, it is possible to supply the lubricant oil efficiently from the porous rolling elements 3a to the mutually opposed track surfaces 1a, 2a. This makes it possible to provide lubrication with a minimum number (one through a half of the total quantity) of the porous rolling elements 3a, decrease loss of oil and perform lubrication with a smaller amount of lubricant oil, leading also to cost advantages.

As for adjustment of the number of porous rolling elements 3a, in cases where the porous rolling elements 3a and the non-porous rolling elements 3b come under a load from the inner ring 1 and the outer ring 2 and therefore the bearing is expected to receive a large load, only one porous rolling element 3a is included. On the contrary, if the expected load is small, the number of the porous rolling element 3a is selected from two through a half of the total number, whereby it is possible to include a large number of the porous rolling elements 3a which are impregnated with the lubricant oil and it is also possible to increase life by increasing an amount of the lubricant oil that way.

The porous rolling element 3a has a smaller diameter than that of the non-porous rolling element 3b. For example, it is preferable that when compared with the diameter of the non-porous rolling element (3b) as being 1, the diameter of the porous rolling element (3a) is 0.80 through 0.99.

By making the diameter of the porous rolling element 3a slightly smaller than that of the non-porous rolling element 3b (diameter ratio not greater than 0.99), the porous rolling element 3a becomes not subjected to the load, making it possible to greatly decrease breakage by pressure. The arrangement also makes it possible to use the porous rolling elements 3a which are of a lower grade of precision and allows easier assembly, making it possible to provide even more inexpensive bearings.

As mentioned, the diameter ratio of the porous rolling element 3a in the lower limit of the range is preferably 0.80 or so. Reasons for this include that the porous rolling element 3a of a smaller diameter can carry only a smaller amount of lubricant oil impregnated therewith, and has decreased chance of contact between the porous rolling element 3a and the track surfaces 1a, 2a, making is difficult to supply lubricant oil to the track surfaces 1a, 2a.

In cases where a plurality of the porous rolling elements 3a are utilized, it is preferable that the porous rolling elements 3a are disposed not adjacently to each other, so that the porous rolling elements 3a will not make contact with each other.

Preferably, the porous rolling element 3a has a degree of porosity not smaller than 30 percent. Since the porous rolling element 3a is supposed to be non-load bearing, it is possible to make its degree of porosity greater than 30 percent. This makes it possible that a single porous rolling element 3a can be impregnated with an increased amount of lubricant oil. A reason for the preference that the degree of porosity should be not smaller than 30 percent is to avoid consequences in cases where an extremely small amount of the lubricant oil is impregnated in the pore space. If the degree of porosity is low, there can be situations where a network of pores is not formed in the porous material but the pores are independent from each other, resulting in poor infiltration of the lubricant oil in the pores.

The lubricant oil impregnated in the porous rolling element 3a is selected in accordance with an application of the bearing. Examples of the lubricant oil include a polyalphaolefin oil, a fluorine oil, a phenyl ether oil, an ester oil, an ionic liquid, and a multialkylated cyclopentane lubricant oil.

For those rolling bearings to be used in an application providing electric conductivity/continuity, an ionic liquid may be selected as the lubricant oil to be impregnated in the porous rolling element 3a.

For those rolling bearings to be used in an anti-chemical attack application, a polyalphaolefin oil may be selected as the lubricant oil to be impregnated in the porous rolling element 3a.

For those rolling bearings to be used in a vacuum and low dust-generation generation application, a multialkylated cyclopentane lubricant oil may be selected as the lubricant oil to be impregnated in the porous rolling element 3a.

For those rolling bearings to be used in a high temperature and vacuum application, a fluorine oil may be selected as the lubricant oil to be impregnated in the porous rolling element 3a.

For those rolling bearings to be used in an anti-radioactive application, a phenyl ether oil may be selected as the lubricant oil to be impregnated in the porous rolling element 3a.

Also, for those rolling bearings to be used in, e.g., guide rollers, where a low-torque in a room temperature is a requirement, an ester oil may be selected.

As has been described thus far, since the rolling bearing according to the present invention makes use of the porous rolling element 3a, the bearing is capable of serving various applications by selecting an appropriate lubricant oil for the impregnation.

Also, unlike solid lubricants, no foreign matters are produced during lubrication from the lubricant oil which is impregnated in the porous rolling element 3a. Hence, the rolling bearing according to the present invention is free from the foreign matter discharge which is peculiar to those bearings that make use of a rolling element formed of a solid lubricant; is a low dust-generation generation type; is not prone to poor rotation caused by generated dust; and therefore is capable of improving torque stability and increasing life.

The present invention is not limited to any of the embodiments described thus far, and it is obvious that the invention may be modified in many other ways within the scope of the present invention. The scope of the present invention is defined by the CLAIMS and includes all equivalents thereto and any variations therein.

REFERENCE SIGNS LIST

1: Inner ring
1a: Track surface
2: Outer ring
2a: Track surface
3: Rolling element
3a: Porous rolling element
3b: Non-porous rolling element
4: Retainer

The invention claimed is:

1. A rolling bearing comprising: an outer ring (2); an inner ring (1); and a plurality of rolling elements (3) assembled between an outer ring track surface (2a) and an inner ring track surface (1a) opposed to each other; wherein
the plurality of rolling elements (3) is provided by a combination of a porous rolling element (3a) impregnated with a lubricant oil and a non-porous rolling element (3b), and
the porous rolling element is made of polytetrafluoroethylene resin (PTFE).

2. The rolling bearing according to claim 1, wherein the porous rolling element (3a) has a diameter smaller than that of the non-porous rolling element (3b).

3. The rolling bearing according to claim 2, wherein the diameter of the porous rolling element (3a) is 80-99 percent of the diameter of the non-porous rolling element (3b).

4. The rolling bearing according to claim 1, wherein a total number of the porous rolling elements (3a) is equal to or smaller than a half of a total number of the plurality of rolling element (3).

5. The rolling bearing according to claim 1, wherein the porous rolling elements (3a) are not disposed adjacently to each other.

6. The rolling bearing according to claim 1, wherein the porous rolling elements (3a) has a degree of porosity not smaller than 30 percent.

7. The rolling bearing according to claim 1, wherein the lubricant oil impregnated in the porous rolling element (3a) is selected from a polyalphaolefin oil, a fluorine oil, a phenyl ether oil, an ester oil, an ionic liquid, and a multialkylated cyclopentane lubricant oil.

8. The rolling bearing according to claim 7, for use in an application requiring electrical conductivity/continuity, wherein the lubricant oil impregnated in the porous rolling element (3a) is provided by an ionic liquid.

9. The rolling bearing according to claim 7, for use in an anti-chemical attack application, wherein the lubricant oil impregnated in the porous rolling element (3a) is provided by a polyalphaolefin oil.

10. The rolling bearing according to claim 7, for use in a vacuum and low dust-generation application, wherein the lubricant oil impregnated in the porous rolling element (3a) is provided by a multialkylated cyclopentane lubricant oil.

11. The rolling bearing according to claim 7, for use in a high temperature and vacuum application, wherein the lubricant oil impregnated in the porous rolling element (3a) is provided by a fluorine oil.

12. The rolling bearing according to claim 7, for use in an anti-radioactive application, wherein the lubricant oil impregnated in the porous rolling element (3a) is provided by a phenyl ether oil.

13. The rolling bearing according to claim 7, for use in a room temperature and low-torque application, wherein the lubricant oil impregnated in the porous rolling element (3a) is provided by an ester oil.

* * * * *